April 25, 1961 R. PAQUIN 2,980,985
MILLING CUTTER
Filed Oct. 28, 1958 3 Sheets-Sheet 1
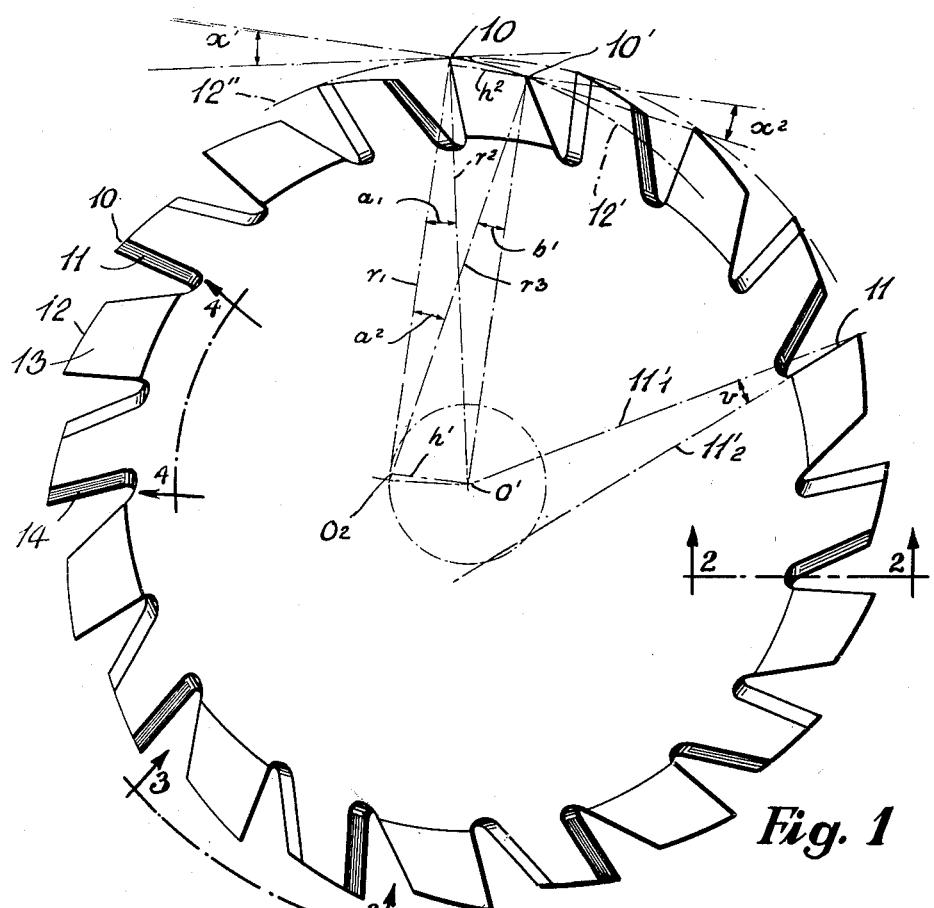
Fig. 1
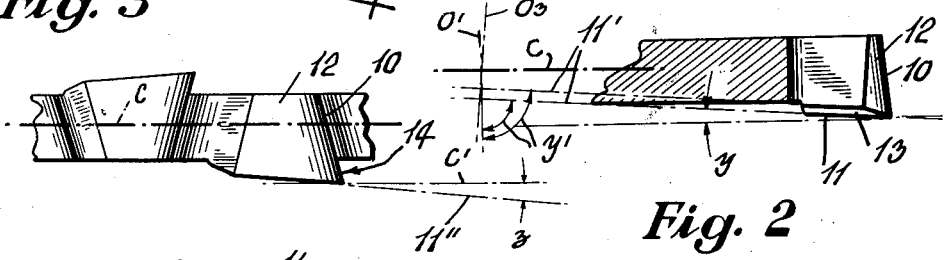
Fig. 3
Fig. 2
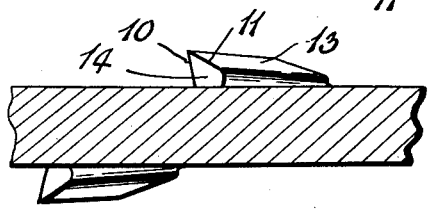
Fig. 4
INVENTOR
Real PAQUIN
BY
ATTORNEYS

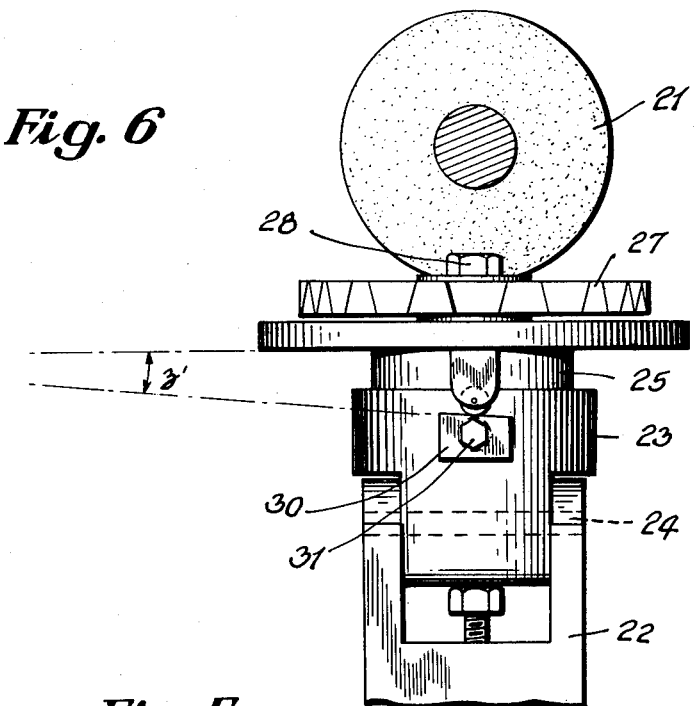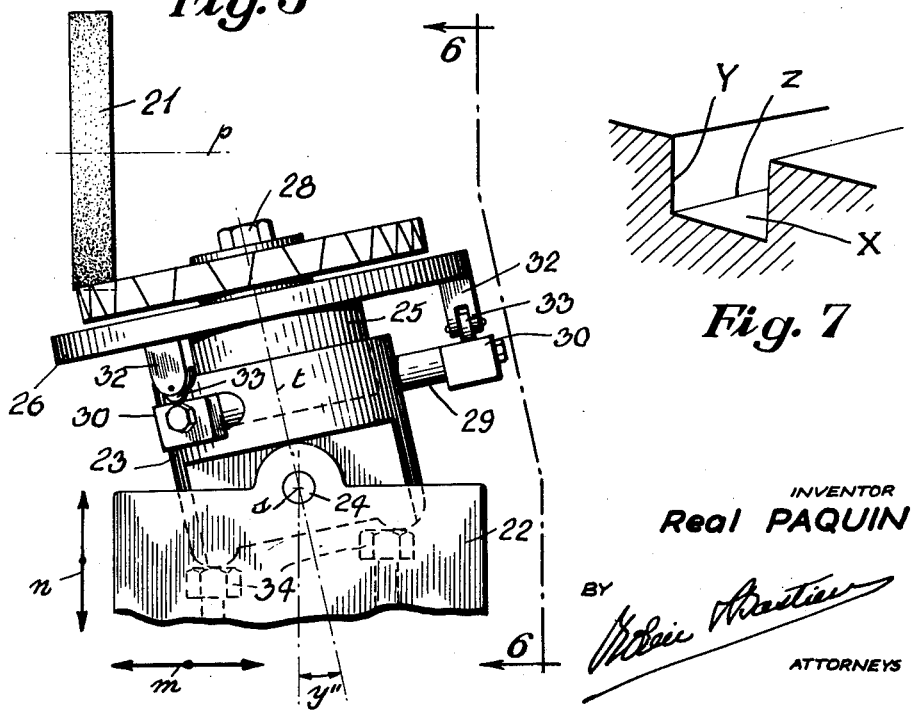

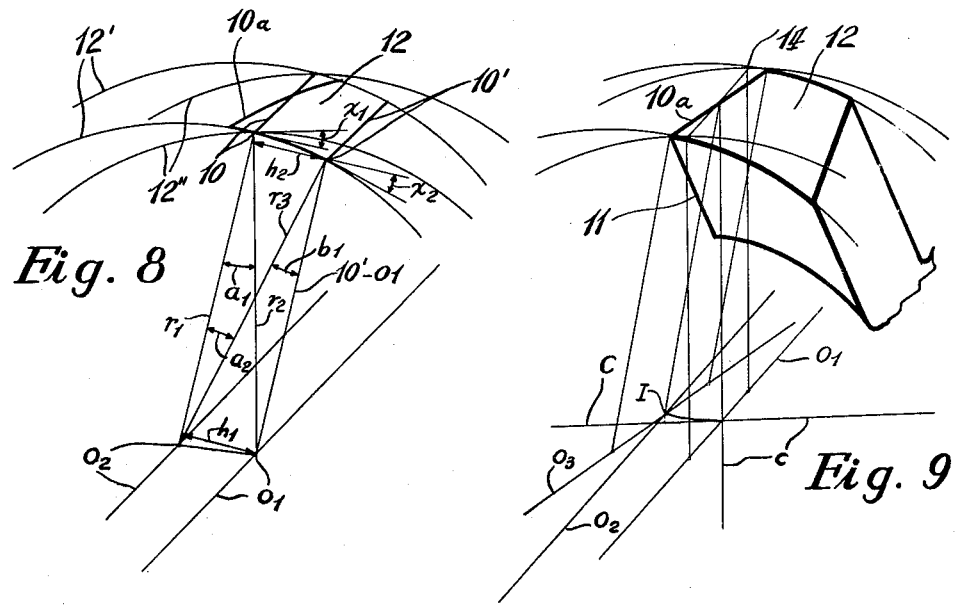
Fig. 8
Fig. 9
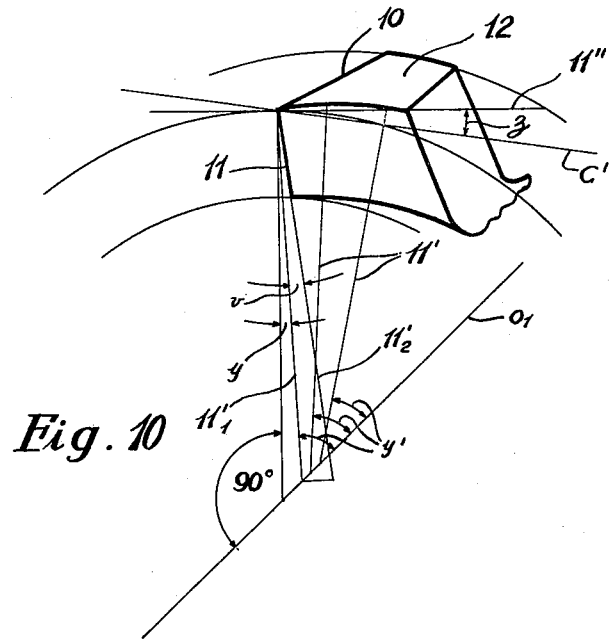
Fig. 10
INVENTOR
Réal PAQUIN
BY
ATTORNEYS

United States Patent Office 2,980,985
Patented Apr. 25, 1961

2,980,985
MILLING CUTTER

Real Paquin, Rosemount, Quebec, Canada, assignor to Ferro Technique Ltd., Montreal, Quebec, Canada, a body corporate and politic Filed Oct. 28, 1958, Ser. No. 770,147
4 Claims. (Cl. 29—103)

The present application is a continuation-in-part application of U.S. patent application Ser. No. 521,340, filed July 11, 1955, now abandoned.

The present invention relates to circular milling cutters and in particular to an improvement in the form of the teeth of such cutters.

It is common practice, in milling cutters known hitherto, to relieve the face of each tooth immediately adjacent the cutting edges by flat or curved lands which extend inwardly at an angle to the peripheral cylindrical surface and the side surface of the cutter, in order to prevent rubbing or binding of the face on the part of the groove which has been cut by the cutting edge. It has been found that the clearance angles between the relieved lands and the peripheral and side surfaces of the cutter should be maintained at as constant a value as possible. In effect, if the angle is too small rubbing will occur, and if it is too large insufficient backing is provided for the cutting edge which is thus easily broken. It is necessary therefore, in conventional cutters, to regrind the land upon each resharpening operation, to restore its optimum inclination.

Such regrinding has two principal disadvantages:

(1) The grinding operation requires several grinding set-ups, namely at least one set-up for the peripheral face of the tooth, at least one set-up for the side face of the tooth, and usually at least one set-up for the front face of the tooth.

(2) Upon each regrinding operation, the thickness and diameter of the cutter are substantially decreased, so that after a few sharpenings the cutter has to be ground down to the next lower standard size.

The present invention obviates the above disadvantages by providing a milling cutter which only requires frontal grinding for resharpening, because both peripheral and side faces are so shaped that successive front grindings will not vary the clearance angles.

In view of the fact that only frontal grinding is required, it will be seen that both the above mentioned disadvantages are overcome, because:

(1) only one grinding set-up is required instead of at least three (and usually more), and (2) the dimensions of the cutter decrease much less rapidly, whereby the useful life of the cutter is greatly lengthened. The particular shape of the teeth of a cutter according to the present invention will now be described with reference to the accompanying drawings in which:

Fig. 1 is a plan view of a staggered tooth side-milling cutter constructed in accordance with the invention;

Fig. 2 is a section on line 2—2 of Fig. 1;

Fig. 3 is a developed elevational view on line 3—3 of Fig. 1;

Fig. 4 is a developed section on line 4—4 of Fig. 1;

Fig. 5 is a side elevation of the grinding set-up used in forming the side face of the cutter teeth;

Fig. 6 is a developed front elevation of the set-up taken on the compound line 6—6 of Fig. 5; and Fig. 7 is a diagrammatic perspective view of a groove cut by a milling cutter.

Figs. 8, 9 and 10 are perspective views illustrating the geometrical relationship of the peripheral and side surfaces of the cutting teeth.

It should be noted that angles and dimensions have been exaggerated in the drawings for the sake of clarity.

In the drawings like reference characters indicate the same elements in the several figures. It should also be noted that the invention is illustrated and described only by way of example, with reference to a staggered tooth side-milling cutter, but is equally applicable to other known types of cutters.

With reference to Figs. 1–4 the cutter shown is of a well-known type, comprising an even number of teeth alternately projecting on opposite sides of the body of the cutter. The invention is exclusively concerned with the form of the individual teeth.

Each tooth is provided with a peripheral cutting edge 10 and a side cutting edge 11. The peripheral cutting edge 10 is backed by a peripheral relieved face 12, and the side cutting edge 11 by a relieved side face 13. The front face of the tooth is indicated at 14.

With reference to Fig. 7, each tooth requires three separate clearances, namely:

(1) clearance of the peripheral face 12 with respect to the bottom face X of the grooves;

(2) clearance of the side face 13 with respect to lines of the side of the groove parallel to the line Y; and (3) clearance of the side face 13 with respect to lines of side of the groove parallel to the line Z.

In the following description the angles defining the three clearances will be referred to as:

(1) peripheral clearance angle $x$.
(2) radial clearance angle $y$.
(3) tangetial clearance angle $z$.

Peripheral face

According to the invention, the peripheral face 12 is defined by a surface of revolution indicated at 12' at the top of Fig. 1 and in Fig. 8. The surface of revolution 12' has a radius $r_1=r_2$; $r_2$ being the radius of the outer surface of revolution 12" of the cutter. It will be assumed for the moment that the cutting edge 10 is parallel to the axis $O_1$ of the cutter. The axis $O_2$ of surface of revolution 12' is parallel to the axis $O_1$ of the cutter and is offset therefrom. It is evident that the offset angle $a_1$, measured from the edge 10 must be equal to the clearance angle $x_1$ at the edge 10, angle $x_1$ being the angle between planes tangent to surfaces of revolution 12' and 12" at the edge 10.

Upon successive frontal grindings, the edge 10 will be shifted towards the right in Figs. 1 and 8, however the clearance angle $x$, due to the above described structure, will remain constant. To prove this, a second position 10' of the cutting edge will be considered, in which the cutting edge has been shifted through an angle $a_2$ equal to $a_1$ and $x_1$. At the position 10' the clearance angle is indicated by $x_2$. It will be proved that $x_2=x_1$. The proof is strictly valid only for the two extreme positions 10 and 10' of the cutting edge, as defined above, but the construction may be safely assumed to hold within the strictest tolerances for any intermediate position. Strictly speaking the required curve is a spiral, of which the cylindrical surface according to the invention is a very close approximation.

The proof is as follows: The geometrical construction gives the following relations:

$$x_1=a_1$$
$$x_2=b_1$$
$$a_1=a_2$$
$$r_1=r_2=r_3$$

Therefore $\Delta 10-O_2-O_1=\Delta 10-O_2-10'$ since these two triangles have two sides and the included angle equal. The heights of the two above triangles are indicated by $h_1$ and $h_2$.

Now $h_1=h_2$. Therefore lines $10-O_2$ and $10'-O_1$ are parallel.

Therefore $b_1=a_2$, and thus $b_1=a_1$.

Therefore $x_1=x_2$, and the clearance angle remains constant. The grinding set-up necessary to obtain the peripheral face 12 according to the invention is very simple, and merely involves mounting the outer about axis $O_2$ and rotating it against the grinding wheel.

It will also be noted that if, as in the instant case, the actual cutting edge 10a is skew with respect to the axis $O_1$ of the cutter, the edge 10a does not lie entirely within the surface 12", the centre and the trailing end of the edge 10a being closer to axis $O_1$ than respectively the leading end and the centre of it. For a cutter strictly used for side milling this is of no importance. Furthermore for most practical applications the deflection will be within the allowable tolerances. However, to obviate this difficulty to a larger extent the cylindrical surface of face 12 may have its axis $O_3$ (Figs. 2 and 9) lying in a plane not parallel to axis $O_1$, but inclined towards the trailing end of cutting edge 10. Axis $O_3$ will be otherwise constructed as axis $O_2$. The offset of axis $O_3$ will be measured with reference to the intersection I of this axis $O_3$ with the central plane C of the cutter. The inclination of axis $O_3$ will be in proportion to the angle between front face 14 and axis $O_1$.

Side face

The side face 13 is defined by a line 11' (Figs. 2 and 10) undergoing two movements, namely rotation about axis $O_1$ and simultaneously translation along axis $O_1$, while remaining at a constant angle $y_1$ to axis $O_1$, such that angle $y_1$ is the complement of the angle $y$.

Such a line 11' will define a warped surface analytically termed a hyperbolic paraboloid.

It will be seen that the radial clearance is constant upon successive face grindings, because the line 11' keeps at a constant angle $y_1$ to the axis $O_1$.

The ratio of rotation and translational movement defines a constant angle $z$. It will be recalled in effect that a hyperbolic paraboloid contains two families of lines at an angle to each other, one of these families being represented in the present case by successive positions of line 11'. Any line of the other family of lines, such as a line 11" in Figs. 3 and 10 defines an angle such as $z$ with any plane parallel to the plane C of the cutter, such as plane C'. It is evident of course that various lines such as 11" will define different angles $z$, so that the angle $z$ should be taken with reference to the outermost line 11" of face 13. In any case the clearance of any point of face 13 is given by a combination of clearance angles $y$ and $z$, and it is clear that as the angle $z$ decreases towards the centre, this will be compensated by the increased effect of angle $y$.

In order to afford clearer understanding of the configuration of the side face 13, a grinding set-up which may be used to obtain face 13 is shown in Figs. 5 and 6, and will be described hereafter.

The set-up comprises a fixed grinding wheel 21 and a base member 22 mounted for rectilinear movement in horizontal and vertical directions along arrows $m$ and $n$. A bearing block 23 is pivotally mounted on the base 22 about shaft 24. Bearing block 23 receives a shaft 25 of a plate 26.

The cutter 27 is fixed to plate 26 by means of a nut 28.

The bearing block 23 comprises three projections 29, equally spaced around its circumference, to which are adjustably secured inclined plane elements 30 by means of bolts 31.

Plate 26 has three forked members 32 projecting from its bottom face, to which are rotatably attached rollers 33.

Each roller 33 is adapted to ride in one of elements 30.

The following geometrical relations, taken, for convenience, with reference to horizontal and vertical planes, are provided for.

As mentioned before the directions $m$ and $n$ are exactly horizontal and vertical respectively.

The axis $p$ of grinding wheel 21 is horizontal and parallel to line $m$.

The axis $s$ of shaft 24 is horizontal and lies in a vertical plane perpendicular to the axis of grinding wheel 21.

The axis $t$ of shaft 25 and bearing 23 intersects and is perpendicular to the axis $s$, and lies in a vertical plane containing axis $p$.

The axis $t$ is inclined to the horizontal at an angle $y''$ equal to the radical clearance angle $y$ (see Fig. 2).

The angle of axis $t$ can be adjusted by means of bolts 34.

The inclined plane elements 30 are all at the same level with reference to axis $t$ and have all the same inclination. Their indication $z'$ (Fig. 6) with reference to a plane perpendicular to $t$ is a function of the tangential clearance angle $z$ (Fig. 3), the variable of the function being the ratio between the distance of a tooth from axis $t$ and the distance of roller 33 from axis $t$ (namely if the roller is disposed precisely under the tooth, then $z'=z$).

The operation is as follows: base 22 is first brought to the suitable level by movement along $n$, and is then displaced along $m$ while at the same time plate 26 is rotated about $t$; this will produce essentially the surface 13 described previously with reference to Figs. 2 and 3.

It will be noted that the inclined plane of element 30 will cause line 11" (Fig. 3) to be slightly elliptical, instead of straight. In practice this is of no consequence; however, in order to obtain line 11" as a straight line, element 30 may be formed with a helical surface rather than a flat inclined plane.

In the foregoing the angle $y$ has been measured as defined by the angle $y'$ between line 11' and axis $O_1$. It will be seen however in Fig. 1 that in practice the cutting edge 11 is disposed along a line $11'_2$ offset from the radial position 11' of line 11' by an angle $v$. It is preferable to measure the required radial clearance angle $y$ with respect to line $11'_2$ rather than with $11'_1$ so that the effective angle of line 11' to the cutter plane C (Fig. 2) will be smaller than the predetermined angle $y$, since the shift of line 11' to position $11'_2$ has taken place within the surface defined by angle $z$ and lines 11". Consequently, in the grinding set-up of Fig. 5, the angle $y''$ must equal the new angle as measured against line 112'. Thus in practice the axis $t$ will be less inclined than shown in the figure, and may even be vertical or inclined in the opposite direction. The modified angle $y''$ is a function of angle $y$, whose variable is given by angle $v$, namely the amount of offset, of line $11'_2$.

The soundness of the above construction of a milling cutter in accordance with the invention has been amply proved by means of thorough tests which clearly establish the superiority of the new cutters over those of standard design.

In addition to the labour saving and the prolonged life afforded by the simplified frontal sharpening made possible by the invention, the cutters have been shown to have improved free-cutting characteristics, which produce better finishes and decrease power consumption, while allowing considerably faster milling speeds.

It will be understood that the invention is not restricted to the examples shown and described, and various modifications are encompassed within the scope of the appended claims.

What I claim is:

1. A staggered tooth side-milling cutter wherein each tooth comprises a peripheral cutting edge and an adjacent front face inclined to the axis of the cutter and an adjacent peripheral cylindrical face of radius equal to the radius of the cutter, the axis of said cylindrical face lying in a plane parallel to the axis of the cutter, and being inclined towards the trailing end of said cutting edge at an angle proportional to the angle said front face makes with the axis of the cutter, the intersection of the axis of said cylindrical face with the central plane of the cutter being offset from the axis of the cutter by an angle equal to a predetermined required clearance angle of said peripheral face.

2. A circular milling cutter wherein each tooth comprises a side cutting edge and an adjacent side face the surface of which is defined by a line intersecting an axis parallel to the axis of the cutter and rotating about said first axis at its point of intersection therewith and simultaneously being displaced inwardly along said first axis, while remaining at a constant angle to said first axis, said constant angle being proportional to a predetermined required radial clearance angle of said side face, and wherein said line defines a hyperbolic paraboloid having two families of lines, one such family comprising all consecutive positions of said line, the outermost line of the other family making with the plane of the cutter an angle equal to a predetermined required tangential clearance angle of said side face.

3. A circular milling cutter as claimed in claim 2, wherein said first axis is the axis of the cutter.

4. A circular milling cutter as claimed in claim 2, wherein said side cutting edge extends along a line offset from the radius of the cutter and said constant angle is proportional to the radial clearance angle and to the offset angle and is so determined that said offset line forms with the plane of the cutter an angle equal to the radial clearance angle.

References Cited in the file of this patent

UNITED STATES PATENTS

| | | |
|---|---|---|
| 45,294 | Brown | Nov. 29, 1864 |
| 75,219 | Taylor | Mar. 3, 1868 |
| 82,402 | Harrington | Sept. 22, 1868 |
| 1,319,714 | Laurenz | Oct. 28, 1919 |
| 1,483,950 | Peterson | Feb. 19, 1924 |
| 1,829,292 | Olson | Oct. 27, 1931 |
| 2,111,887 | Challier | Mar. 22, 1938 |
| 2,183,922 | Robbins | Dec. 19, 1939 |
| 2,456,842 | Rutbell | Dec. 21, 1948 |